United States Patent [19]

Hausmann

[11] 4,106,596
[45] Aug. 15, 1978

[54] HYDROPNEUMATIC SINGLE TUBE SHOCK ABSORBER, IN PARTICULAR STEERING SHOCK ABSORBER

[75] Inventor: Erwin Hausmann, Wuppertal, Fed. Rep. of Germany

[73] Assignee: Firma August Bilstein, Ennepetal-Altenvoerde, Fed. Rep. of Germany

[21] Appl. No.: 739,552

[22] Filed: Nov. 8, 1976

[30] Foreign Application Priority Data

Nov. 17, 1975 [DE] Fed. Rep. of Germany ....... 2551516

[51] Int. Cl.² ............................ F16F 9/06; F16F 9/40
[52] U.S. Cl. .................... 188/314; 188/269; 188/282
[58] Field of Search ............ 188/269, 281, 282, 314, 188/315, 317; 267/64 R; 248/354 H

[56] References Cited

U.S. PATENT DOCUMENTS

| 3,070,191 | 12/1962 | Allinquant | 188/317 |
| 3,592,302 | 7/1971 | Allinquant | 188/314 X |
| 3,787,019 | 1/1974 | Freitag | 248/354 H X |

FOREIGN PATENT DOCUMENTS

| 490,820 | 2/1953 | Canada | 188/282 |
| 1,195,615 | 6/1965 | Fed. Rep. of Germany | 188/314 |
| 282,944 | 1/1971 | U.S.S.R. | 188/269 |

*Primary Examiner*—George E. A. Halvosa
*Attorney, Agent, or Firm*—Neuman, Williams, Anderson & Olson

[57] ABSTRACT

A damper cylinder is partially filled with highly compressed gas and with operating fluid. A damping piston and connected rod portion are reciprocally movable in the cylinder operating fluid. A partition wall is fixedly mounted in the inner periphery of the cylinder and is interposed between the piston and a highly compressed gas chamber in the cylinder. The partition wall has valves opening in turn during the in and out movements of the damping piston and rod; the valve which opens during the outward movement of the working piston and rod having a closing force approximately equal to the product of such compressed gas and the effective cross-section of such outward movement valve.

4 Claims, 4 Drawing Figures

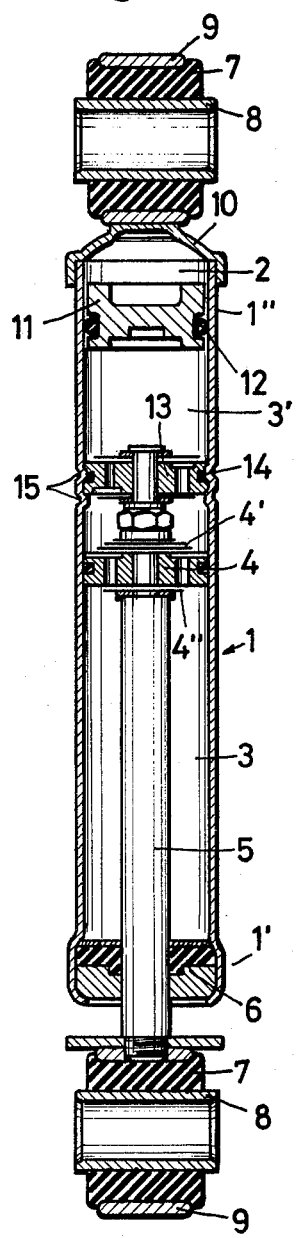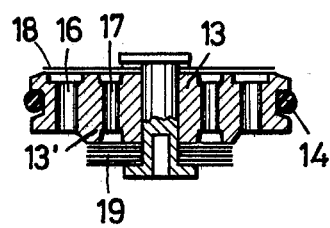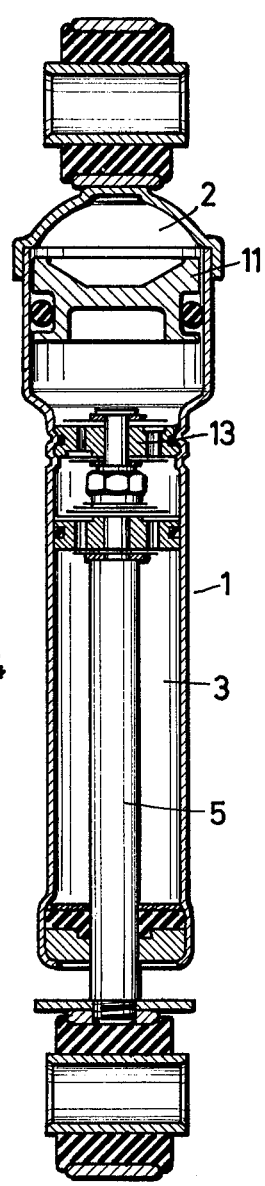

HYDROPNEUMATIC SINGLE TUBE SHOCK ABSORBER, IN PARTICULAR STEERING SHOCK ABSORBER

The invention relates to a single tube hydropneumatic shock absorber, and in particular pertains to a steering shock absorber.

Hydropneumatic single-tube shock absorbers are well-known in the prior art. Where they are intended for use as motor vehicle steering shock absorbers a compressed gas chamber of such shock absorbers, which is generally separated from the opening fluid by a flexible cylinder diaphragm and accommodated in a zone of the cylinder of larger diameter is, as a rule, only filled with gas under low pressure. As a result, the operating fluid is under correspondingly low pressure or is particularly free from pressure. Such low pressures are advantageous, particularly in the case of steering shock absorbers, since they allow a small outlet force, or none at all, to be produced on the piston rod and they are in all cases compensated by the frictional forces between piston rod and the piston-rod passage seal at the corresponding end of the damper cylinder.

Valves are provided in an intermediate partition wall fixedly disposed in the cylinder between the compressed gas chamber and the working piston. These valves act in much the same way as the bottom valves fitted to prior art double-tube dampers, in that valves which are effective during the respective outward movements of the piston rod open relatively easily, whereas the other valve or valves, i.e., those effective during the respective inward movements of the piston rod, are more strongly prestressed.

These known steering shock absorbers with partition-wall valves are, however, accompanied by all the defects occurring in the pressureless or low-pressure shock absorbers, and in particular, deficient prevention of cavitation or freedom to foam, poor temperature stability and deficient sensitivity.

Therefore, a change has already been made in the art relating to the use of hydropneumatic single-tube shock absorbers with highly prestressed compressed gas, in particular for steering dampers, and especially those that are provided with a separating piston arranged sealingly movable within the damper cylinder wall. These well-known compressed-gas, single-tube shock absorbers which have no intermediate partition wall provided with valves, are distinguished above all for their high sensitivity, extensive freedom from foaming and temperature stability, so that they are used for damping suspensions of vehicle wheels to an increasing extent. On the other hand, these compressed gas dampers have the property of the high gas pressure exerting a correspondingly high outlet force on the piston rod. This can have a very disturbing effect in special cases, especially when used as steering dampers, as the piston rod outward force influences steering in an unfavorable way in the form of one-sided action.

It is an object of this invention, therefore, to provide a hydropneumatic single-tube shock absorber, in particular a steering damper, which combines the advantages of the high-pressure shock absorbers with those of the low-pressure or pressureless shock absorbers while at the same time avoiding their drawbacks and where in particular, despite the high-pressure gas filling, no piston rod outlet force occurs.

It is a further object of this invention to provide a shock absorber of the type mentioned, in which the closing force of the partition valve which opens during the output movement of the piston rod is approximately equal to the product of gas pressure and effective cross-section of the partition valve.

It is thus another object of this invention to provide a shock absorber of the kind memtioned above in which the gas chamber pressure very much exceeds the atmospheric or other lower pressure in the working chamber, but in which the high gas pressure is not normally applied to the piston.

The above and other objects of this invention will become more apparent from the following description when read in the light of the accompanying drawing and appended claims.

According to this invention, therefore, the partition valve which is active during the outward movement of the piston rod is to be so greatly prestressed that it opposes the opening force needed for lifting the movable or flexible valve means from the partition valve seat and produced by the gas pressure. The closing force K of the valve in question should therefore be $K \approx p \times q$, $p$ being the gas pressure and $q$ the effective cross-section of the valve.

Because the frictional force occurring between the periphery of the piston rod and the piston rod seal at the respective end of the cylinder is added as the force which additionally impedes the outward movement of the piston rod, the above-mentioned closing force can also be rather smaller than the aforementioned product of cross-section of valve and gas pressure. In this way a high pressure gas shock absorber is obtained, which in the dismantled state the piston rod thereof surprisingly does not move out to its end position, but remains in any adjusted outward position.

Since in spite of the strong closing force of the partition valve in question at this point, no apreciable contribution to shock absorption is made during the outward position of the piston rod, it is as well for damper valve which is effective during the outward movements of the piston rod and disposed in the working piston to be adjusted correspondingly more strongly than the damper valve of the piston that is effective during the inward movement.

For steering shock absorbers it is recommended in particular to provide between the compressed gas and the working fluid chambers in a manner well-known in the art, a separating piston guided movably with a seal on the damper cylinder wall. Such separating piston assures that the shock absorber operation is entirely independent of the position of installation; it can be mounted in any desired installed position, i.e., especially in the horizontal position that is characteristic of shock absorbers.

Finally, the invention also makes provision for the separation partition to consist advantageously of a valve disc sealed on the periphery by means of an "O" ring and attached by flanged proturberances on the damper cylinder wall and provided with valve apertures situated on two concentric circles, of which the innermost belong to the valves that open during the outward movement of the piston rod, and have a centrally mounted set of valve spring discs with correspondingly great closing force.

The drawing shows embodiments of the provided invention in which:

FIG. 1 illustrates in vertical section a hydropneumatic single tube shock absorber with constant cylinder diameter throughout;

FIG. 2 illustrates on a larger scale a section of the partition of this invention provided with valves; and FIG. 3 illustrates a damper cylinder corresponding to FIG. 1 but with a cylinder of enlarged diameter in the compressed gas zone.

The single-tube shock absorber shown comprises cylinder 1, which is partly filled with compressed gas 2 and operating fluid 3. A working piston 4 is provided with damper valves, and piston rod 5 connected therewith passes exteriorly of the cylinder after sliding through piston rod packing 6. Cylinder 1 is provided adjacent packing 6 with an attachment sleeve 8 resiliently mounted by the pad 7, and with an attachment ring 9.

Opposite end 1" the damper cylinder 1 is sealed by end piece 10 which is likewise provided with an attachment ring 9 with pad or buffer 7 and attachment sleeve 8 mounted thereon. A compressed gas chamber 2 is divided from working fluid chamber 3' by a separating piston 11 which is guided to slide with "O" ring seal 12 in the upper part of the damper cylinder. The pressure in the gas chamber 2 can amount to as much as 30 atmospheres and more.

Between the sealing separating piston 11 and the working piston 4, a partition 13 is provided in the form of a valve plate which is secured by the "O" ring 14 and flanged recess 15 in the cylinder wall. This partition is advantageously of the nature of that represented in FIG. 2 on an enlarged scale. It is provided with valve drillings 16, 17 located on two concentric circles, while the valve apertures 16 are covered or controlled by a weakly prestressed or only slightly rigid valve spring disc 18, the inner apertures 17 (and overlying openings in disc 18) which are traversed during the outward movements of the piston rod 5 by the working fluid 3, are covered or controlled by a relatively thick set of valve spring discs 19. These valve discs 19 lie with their peripheral edge on the edge of the valve disc 13' with such great closing force that in spite of the high gas pressure in the chamber 2 and therefore also in the operating fluid chamber 3' they do not open when the shock absorber is in the rest state. They thus prevent an outward force corresponding to their cross-section and to the gas pressure from acting on the piston rod 5. This indeed practically entirely compensated by the valve spring discs 19. In this way, with the use of the shock absorber designed according to the invention, troublesome effects in steering are accordingly avoided.

As the strongly prestressed valve spring plates 19 in the partition valve provide only an inappreciable contribution to the shock absorption during the outward movement of the piston rod 5, the corresponding damping valve 4' in the working piston 4 will be set correspondingly more strongly than the damping valves 4", active during the inward movements of the piston rod.

The single-tube shock absorber represented in FIG. 3 corresponds in all major constructional characteristics to that represented in FIG. 1. It differs from it merely in that in the zone of the separating piston 11 it has a larger diameter, for obtaining a short constructional length of the damper cylinder 1. In this way a correspondingly larger space is available for the piston rod and temperature-volume compensation, which allows a corresponding shortening of the length of tube.

It will be realized that the new shock absorber can be fitted with other separating devices instead of with a moving separating piston, which make any installed length possible, In the event of this being of no importance, i.e., if the shock absorber is installed merely in the vertical or approximately vertical position represented, it is even possible to dispense altogether with a separating device 11.

I claim:

1. A hydropneumatic tube shock absorber, particularly adapted for use as a steering shock absorber comprising a damper cylinder partially filled with highly compressed gas and operating fluid; said pressure being such as to avoid foaming of said fluid in the normal course of shock absorber operation; a working piston movably mounted in said cylinder in said operating fluid; a piston rod sealingly passing through one end of said cylinder; a partition rigidly installed between the highly compressed gas and the working piston in said operating fluid; said partition being provided with valves that open during the working piston outward and inward movements respectively; the valve opening during the outward movement of the piston rod having a closing force which is substantially greater than the closing force of the valve which opens during the inward movement of the piston rod; the first-mentioned closing force being approximately equal to the product of the pressure of such highly compressed gas and effective cross-section of such outward movement partition valve.

2. A single tube shock absorber according to calim 1, in which the working piston has valves that open during outward and inward piston movements respectively, and characterized in that the valve in the working piston which is in operation during the outward movement of said piston requires more opening force than the valve which is effective during the inward movement.

3. A single tube shock absorber according to claim 1 characterized in that between the compressed gas and the operating fluid there is disposed a separating piston which is guided so as to move sealingly over the damper cylinder wall.

4. A single tube shock absorber according to claim 1, characterized in that the partition consists of a valve disc which is sealed peripherally by means of an "O" ring and attached by means of flange-like protuberances to the damper cylinder wall, and is provided with valve apertures located on two concentric circles, of which the outermost valve apertures belong to said valve that opens during inward movement of the piston rod are covered by first centrally mounted valve spring discs, and the innermost apertures belong to said valve that opens during the outward movement of the piston rod, and are covered by a second centrally mounted set of valve spring discs with greater closing force than said first spring discs.

* * * * *